United States Patent
Stepanski et al.

[11] Patent Number: 6,145,340
[45] Date of Patent: Nov. 14, 2000

[54] PROCESS FOR FRACTIONAL CRYSTALLIZATION OF SUBSTANCES, A CRYSTALLIZER SUITABLE FOR WORKING THE PROCESS, AND USE OF THE PROCESS

[75] Inventors: Manfred Stepanski; Bernhard J. Jans, both of Buchs, Switzerland

[73] Assignee: Sulzer Chemtech AG, Winterthur, Switzerland

[21] Appl. No.: 09/118,701

[22] Filed: Jul. 16, 1998

[30] Foreign Application Priority Data

Jul. 16, 1997 [EP] European Pat. Off. .............. 97810498

[51] Int. Cl.⁷ ................................ B01D 9/04; C02F 1/22
[52] U.S. Cl. .................. 62/532; 62/123; 62/124
[58] Field of Search .............. 62/532, 123, 124, 62/541, 542

[56] References Cited

U.S. PATENT DOCUMENTS

| | | | |
|---|---|---|---|
| 2,977,234 | 3/1961 | Wenzelberger | 62/532 |
| 3,092,673 | 6/1963 | Rush | 62/124 |
| 3,272,875 | 9/1966 | Gordon et al. | |
| 4,683,056 | 7/1987 | Humphries et al. | 210/186 |
| 4,776,177 | 10/1988 | Jancic et al. | 62/123 |

FOREIGN PATENT DOCUMENTS

| | | |
|---|---|---|
| 0 218 545 | 4/1987 | European Pat. Off. . |
| 0 728 508 | 8/1996 | European Pat. Off. . |
| 14 43 066 | 12/1968 | Germany . |

Primary Examiner—William Doerrler
Attorney, Agent, or Firm—Frishauf, Holtz, Goodman, Langer & Chick, P.C.

[57] ABSTRACT

In the process according to the invention for fractionating substances, particularly paraffins, oils, fats and waxes, which, when crystallized, have poor adhesion to the substantially vertical crystallization surfaces (39) of a crystallizer, screen-like supporting structures, e.g. perforated metal sheets (31) bent in a zig-zag, are disposed between the crystallization surfaces (39) of a crystallizer. The crystals (51) becoming detached from the crystallization surfaces (39) during the sweating phase are left suspended in horizontal strips in the triangular zones (41) on the perforated sheet (31) and remain in thermal contact with the crystallization surface (39) and sweat out the liquid phase (55). The mother liquor (55) drips off, in some cases also between the crystals (51) and the crystallization surface (39), with the result that drip channels are melted by the heated mother liquor and thus opened.

20 Claims, 4 Drawing Sheets

6,145,340

PROCESS FOR FRACTIONAL CRYSTALLIZATION OF SUBSTANCES, A CRYSTALLIZER SUITABLE FOR WORKING THE PROCESS, AND USE OF THE PROCESS

REFERENCE TO RELATED APPLICATION

U.S. Ser. No. 09/118,698, filed Jul. 16, 1998, MATZAT et al entitled "A PROCESS AND APPARATUS FOR OBTAINING PARAFFIN OR PARAFFIN FRACTIONS", (claiming priority of European (Swiss) Application EP 97810497.4 of Jul. 16, 1997; Attorney Docket 980396-shf; S-88-6726).

FIELD OF THE INVENTION

The invention relates to a process for the fractional crystallization of substances which, when crystallized, have poor adhesion to the vertical or sloping crystallization surfaces of a crystallizer.

BACKGROUND OF THE INVENTION

In order to fractionate substances by crystallization, a melt is cooled on crystallization surfaces, forming crystals which contain the desired substance. The remaining liquid phase or mother liquor is run off. The crystals are then heated so as to sweat out and run off fractions having lower melting-points. Crystals having a higher melting-point and high purity are left. The purified crystals are then melted, thus obtaining the substance. It has not hitherto been possible to fractionate substances such as paraffins, oils, fats or waxes by this process, since particularly in the "partial melting" or "sweating" phase, there is insufficient adhesion between the vertical crystallization surfaces and the crystallized substances, so that parts of the crystal layer or entire layers become detached and slide off. The sliding-off crystals will then lie on the bottom of the crystallizer and make it difficult or impossible to separate the crystals cleanly from the mother liquor. Even such poorly adhering substances, however, need to be fractionated by modern crystallization techniques. Fractional crystallization has the advantage, inter alia, that it can operate without solvents. It is therefore less expensive and less of a danger to the environment or to human health. It is superior to comparable but outmoded techniques such as removing oil from paraffin by sweating, owing to its shorter working cycles, called "batch times" or "stage times", and since it can be more accurately controlled.

SUMMARY OF THE INVENTION

An object of the invention therefore is to provide a process whereby substances which, when crystallized, can easily become detached from the crystallization surfaces, can be fractionated by crystallization in a crystallizer without crystals slipping off uncontrollably. The process should be faster than earlier processes and should give a higher yield of the desired fractions.

To this end, according to the invention, during sweating, crystals becoming detached from the crystallization surfaces are held by a screen-like supporting structure such that crystals sliding down remain suspended in the screen-like supporting structure whereas liquid fractions flow through the screen-like supporting structure.

As a result of the supporting structures, only partial zones of the crystal layer can become detached and these partial zones remain suspended in the screen-like supporting structure. It is thus still possible to separate the liquid from the crystalline phase or fractions, since the layer of crystals does not slide down completely and consequently cannot clog the spaces between the crystallization surfaces and the outlet for the melt. Since it is now permissible for the crystals to become detached from the crystallization surfaces, the crystals can be uniformly heated more quickly, thus shortening the entire process. The screen-like supporting structure ensures that liquid fractions can flow away whereas the crystals are retained.

Advantageously the screen-like supporting structure inclines towards the crystallization surfaces, since owing to the inclination, crystals detaching and resting on the inclined supporting structure are pressed by their own weight against the crystallization surface and thus remain in thermal contact with the heat-exchanger surface or crystallization surface.

Advantageously, the layers of crystals are held by the said supporting surfaces of the screen-like supporting structure, which divide the layers approximately horizontally into strips, liquid fractions being able to flow away through openings between the crystallization surfaces and the supporting surfaces. The crystals can therefore become detached only in strips which are trapped by the supporting surfaces. The surfaces of the strips are horizontal or inclined, corresponding to the supporting surfaces. The inclination helps sweated-out fractions to flow away.

Advantageously, when the liquid fractions are sweated out, the crystal layer is heated so that it at least partly becomes detached from the crystallization surface and rests on the screen-like supporting structure. By this means the liquid fractions are also expelled by the weight of the crystals. The liquid phase flows away between the two crystal layers and also between the crystal layer and the heated crystallization surface.

Advantageously, the mother liquor obtained from the crystallization process is purified at least once more by fractional crystallization, by applying the above-described process steps to the mother liquor. Advantageously also, the resulting purified fractions are additionally fractionated by conventional fractional crystallization without screen-like supporting structures or by fractional crystallization in accordance with the above-described process steps using screen-like supporting structures. Frequently the purified fractions, as soon as they reach a certain degree of purity, can be additionally purified in crystallizers without screen-like supporting structures. These purer fractions, if they adhere sufficiently to the crystallization surfaces, can advantageously be additionally fractionated and purified by conventional fractional crystallization without a supporting structure. Other less adhesive fractions can be additionally purified by the process according to the invention, using supporting structures in the crystallizer.

The process according to the invention is particularly suitable for purifying paraffins, oils, fats and/or waxes, and other substances having similar physical properties.

The invention also relates to a crystallizer having crystallization surfaces which can be cooled and heated by a heat transfer medium for fractionating substances which when crystallized have poor adhesion to vertical or inclined crystallization surfaces.

The crystallizer according to the invention has a screen-like supporting structure, permeable to the liquid phase or liquid fractions, for trapping crystals which become detached from the crystallization surfaces. The crystallizer according to the invention is therefore suitable for working the process according to the invention.

Advantageously, the screen-like supporting structures are inclined to the crystallization surfaces. As a result of the inclination, the crystals becoming detached remain in thermal contact with the crystallization surfaces or heat-exchanger surfaces. As a result, the heat transfer is of practically constant and uniform efficiency and the crystallization process can be better controlled and completed more quickly.

Advantageously, the screen-like supporting structure has inclined surfaces which divide the space between the crystallization surfaces approximately horizontally. These surfaces divide the crystal layers into strips. As a result, the crystal layer becomes detached from the crystallization surface only in parts which have a predetermined maximum size. These parts remain suspended in the screen-like supporting structure, thus-effectively preventing the spaces between the crystallization surfaces from being clogged by falling crystals. In addition, the crystals on the surface, owing to their weight, expel liquid fractions. The mother liquor or liquid phase can continue to drip over the crystal portions and between them. The liquid phase can also flow away on the surfaces of the screen-like supporting structure, because of the inclination of the surfaces.

Advantageously, superposed inclined surfaces of the screen-like supporting structure are inclined in opposite directions. By this means, the crystals are uniformly assigned to both neighboring crystallization surfaces.

Advantageously, a screen-like supporting structure of this kind is in thermal contact with the crystallization surfaces, so that, particularly in the melting phase, there is optimum heat transfer from the crystallization surfaces to the crystals becoming detached from the crystallization surfaces and lying on the screen-like supporting structure.

Advantageously, the screen-like supporting structure is assembled in units which can be installed between pairs of crystallization surfaces. The structure is therefore easy to produce and install.

Preferably, the screen-like supporting structure is in the form of a metal element bent in a number of zig-zags. Metal has the necessary thermal conductivity and is advantageously easy to work. The zig-zag shape can easily be produced by bending the element and has the preferred properties described hereinbefore. The metal element can be a bent perforated sheet. When the perforated sheet is bent, care should be taken that the edge extends across openings or perforations in the metal, so that when installed there are spaced-apart openings at the lowest point of the inclined supporting surface between the edge of the perforated sheet and the crystallization surface, so that the liquid fractions can run out through the openings. Alternatively, the metal external fittings can be a rod lattice or a network or the like. Perforated sheets with a wide variety of perforations are available commercially. Advantageously, the (perforations are in an interlocking pattern such that in every possible arrangement of the fold line the fold line extends through openings in the screen-like supporting structure.

In addition to the preferred embodiments described, the screen-like supporting structures can have a wide variety of forms, such as sponge-like or felt-like structures, spaced lattices, fabrics, networks, expanded metal, brushes, Raschig rings or similar fillers. The supporting structures can also be made of various materials other than metal, e.g. ceramics, plastic, glass, carbon and/or textile fibers of animal or vegetable origin.

Advantageously, the crystallization surfaces themselves can be inclined, thus as before maintaining contact between detaching crystals and the heat-exchanger surface and enabling the sweated-out fractions to flow away easily.

If it is desired to use only one crystallizer for the process according to the invention, the screen-like supporting structure can advantageously be formed by the crystallization surfaces. As a result, the heat transfer between the heat transfer medium and the screen-like supporting structure and thus to the melt or crystals is better than if the crystallization surfaces and the screen-like supporting structure are two independent parts.

The crystallizer according to the invention can be a falling-film crystallizer or a static crystallizer. Static crystallization is preferred for fractionating substances which when crystallized have poor adhesion to the crystallization surfaces, more particularly for removing oil from paraffin.

The invention also relates to an arrangement of a number of crystallizers for multi-stage fractionation of substances which when crystallized can easily become detached from the vertical or inclined crystallization surfaces of a crystallizer.

The arrangement of crystallizers according to the invention comprises at least one crystallizer having screen-like supporting structures. By this means, substances which in purified crystal form have sufficient adhesion for fractionation in conventional crystallizers can be purified in at least a first step in a crystallizer having the supporting structures according to the invention.

In particular, paraffins, fats, waxes, oils and other substances having similar physical properties can be fractionated or purified by the method described, the crystallizer described and the arrangement of crystallizers described.

BRIEF DESCRIPTION OF THE DRAWINGS

Exemplified embodiments of the invention will now be described with reference to the drawings, in which.

For clarity, corresponding parts of different crystallizers will hereinafter be denoted by the same reference numbers, with prime notation, when the embodiments of the parts may be different.

DETAILED DESCRIPTION OF THE PREFERRED EMBODIMENTS

Figure 1:
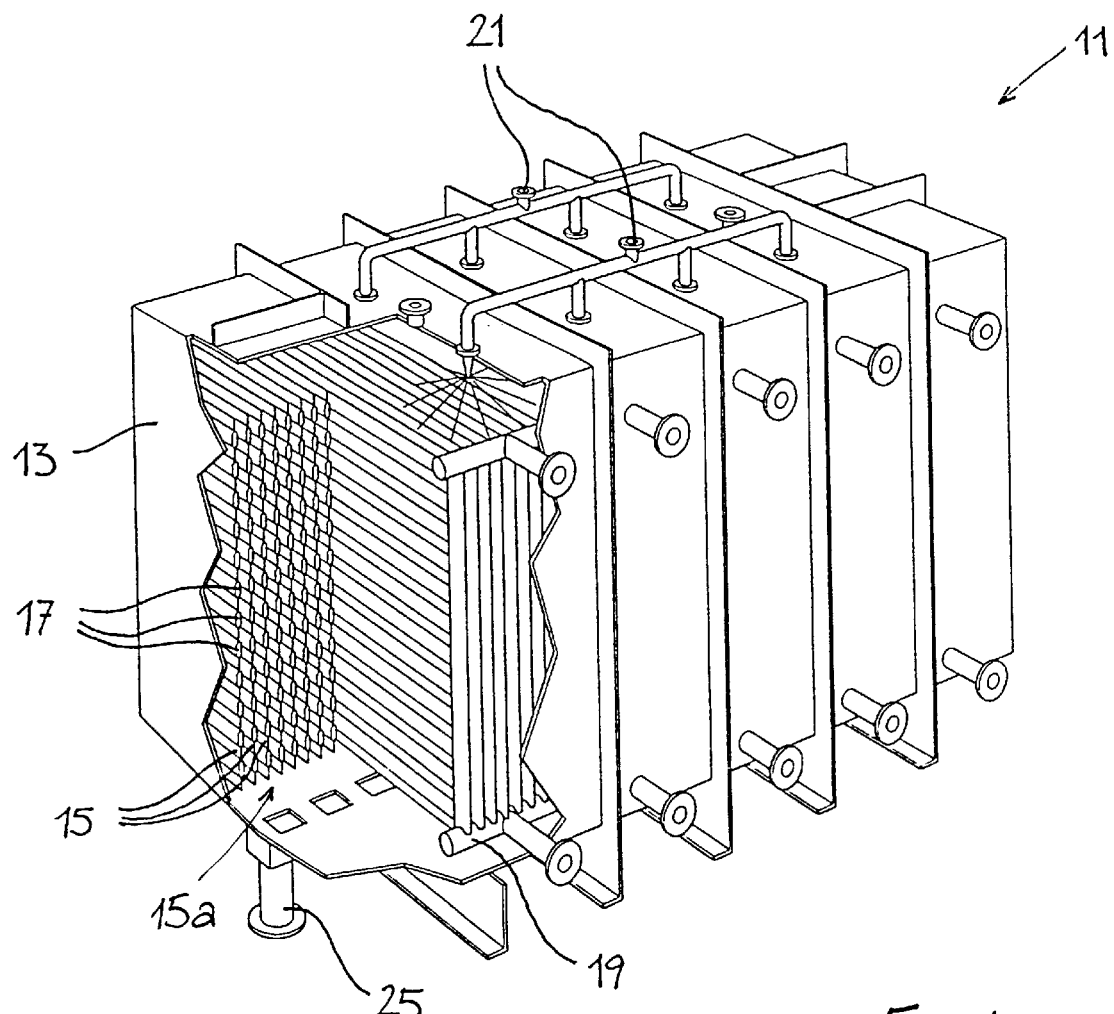
FIG. 1 shows a prior-art crystallizer for static crystallization, in perspective and partly in section.

As shown in FIG. 1, a crystallizer 11 for static crystallization comprises a container 13 for holding the melt and containing a number of spaced-apart crystallization walls 15 of a heat exchanger 15a which can be cooled and heated. After the melt has been poured in, the crystallization walls 15 are completely surrounded by the melt. The crystallization walls 15 have internal ducts 17 through which a heat transfer medium can flow and which are connected to a distribution block 19.

A melt is fed through inlets 21 into the container 13, where it crystallizes out in fractions on the cooled crystallization walls 15. The liquid phase, which always remains after crystallization, is run out through outlets 25, after which fractions and residues of undesired substances in the crystals are sweated out by heating the crystallization walls 15 and are likewise run off, after which the crystals purified by this process are finally melted.

Figure 2:
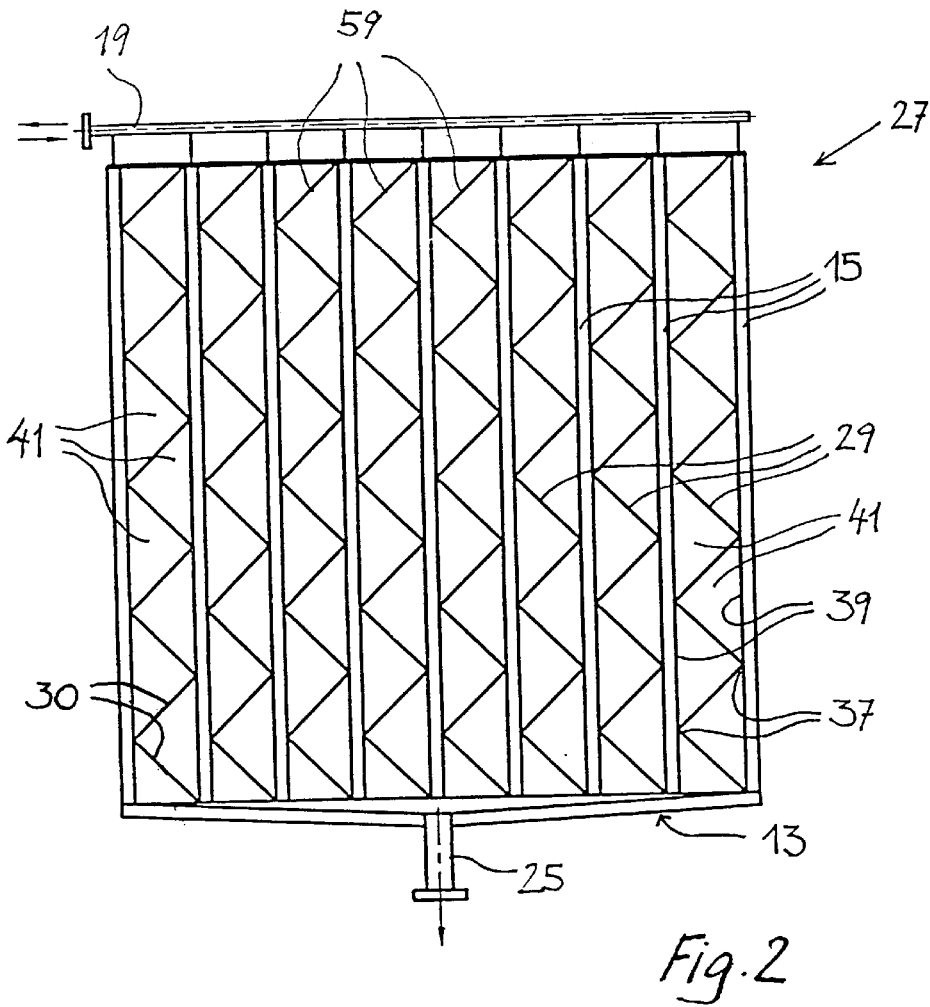
FIG. 2 is a diagrammatic vertical section through a crystallizer according to the invention.
Figures 3, 4:
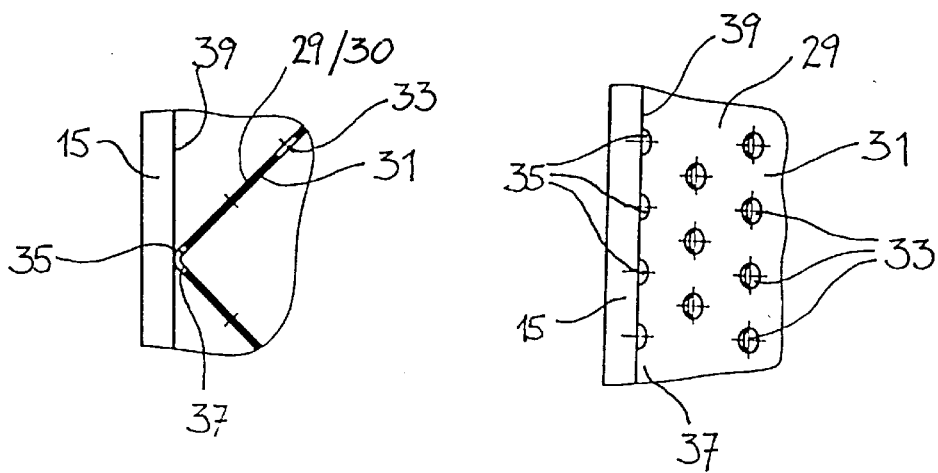
FIG. 3 is a detail showing the point of contact between the external fittings and the crystallization wall.
FIG. 4 is a top view of the place shown in FIG. 3.
Figure 5:
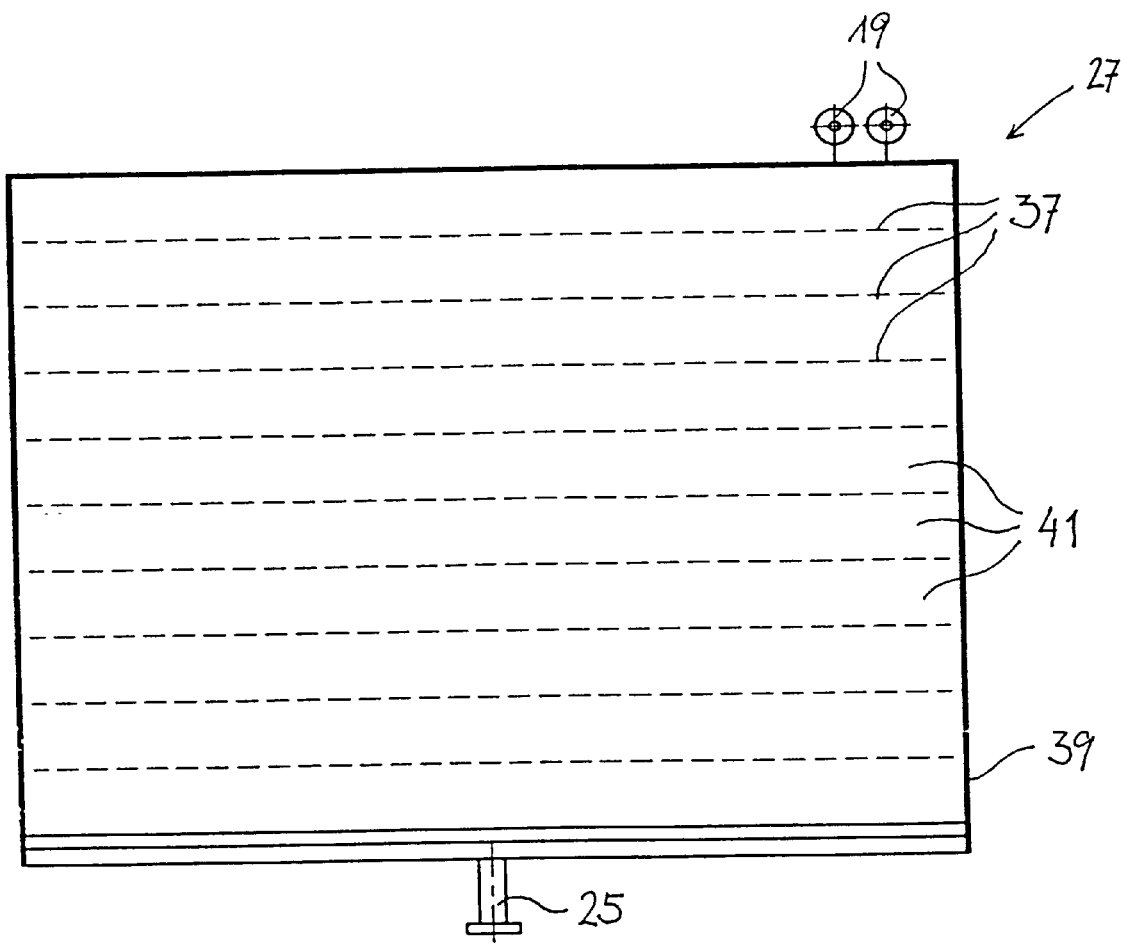
FIG. 5 is a diagrammatic vertical section through a crystallizer according to the invention, rotated through 90° relative to the section in FIG. 2.
Figure 6:
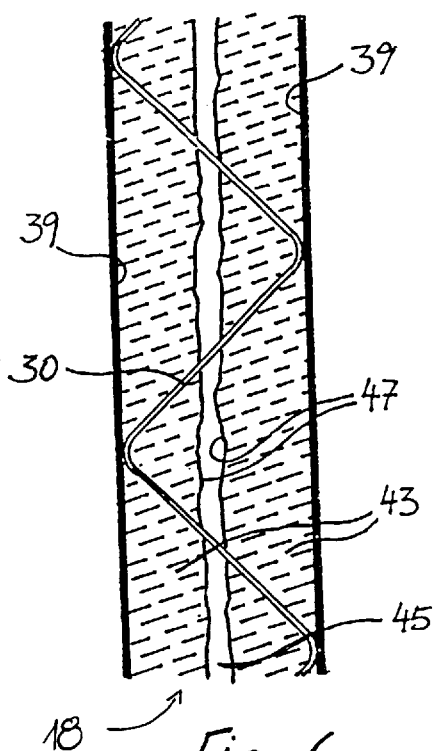
FIG. 6 shows a possible structure of the layer of crystals after crystallization is complete.
Figure 7:
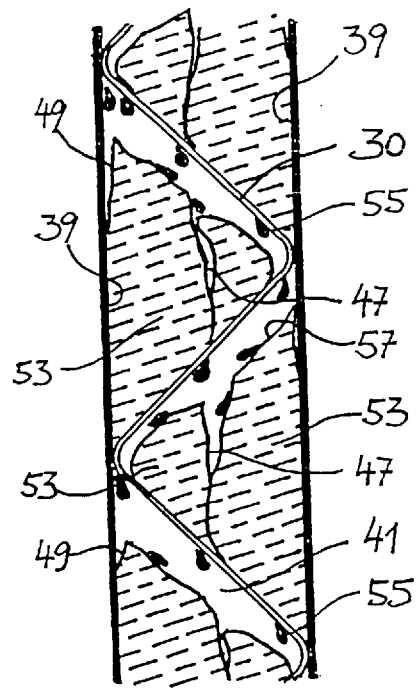
FIG. 7 shows the crystal layer of FIG. 6 during sweating.

A preferred embodiment 27 of the crystallizer according to the invention is shown in simplified form in FIGS. 2 and 5. Screen-like supporting structures 29 are disposed between the crystallization walls 15 inside the container 13. The supporting structures 29 are made from perforated metal sheets 31 (FIGS. 3 and 4). The perforations 33, 35 in the perforated metal sheets 31 enable the liquid phase to flow through the screen-like supporting structures 29. The perforated sheet 29 is folded in a zig-zag, so that neighboring edges 37 are in contact with opposite crystallization surfaces 39. The crystallizer can comprise at least two spaced apart crystallization surfaces (39). The screen-like supporting structure (29) can have surfaces (30) which divide the space between the crystallization surfaces (39) approximately horizontally. The surfaces (30) can be superposed inclined surfaces which slope in opposite directions. The edges 37 are practically horizontal (FIG. 5). One row of perforations 35 is disposed on the edge 37 of the perforated sheet, so that the liquid phase can run out even in the lowest regions of the triangular zones 41.

Figure 8:
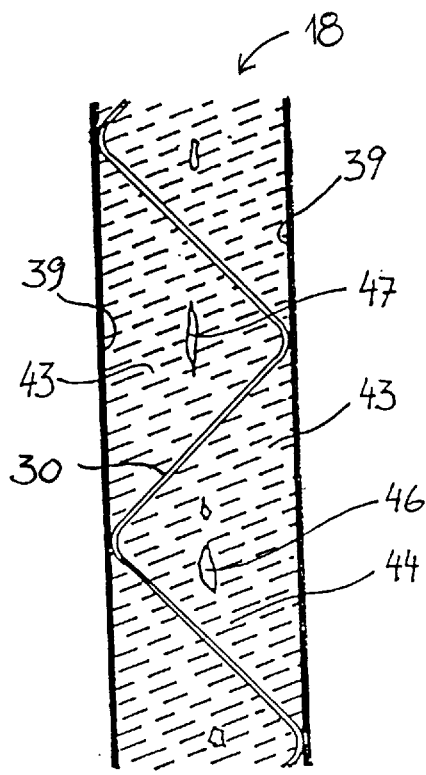
FIG. 8 shows another possible structure of the crystal layer after crystallization.
Figure 9:
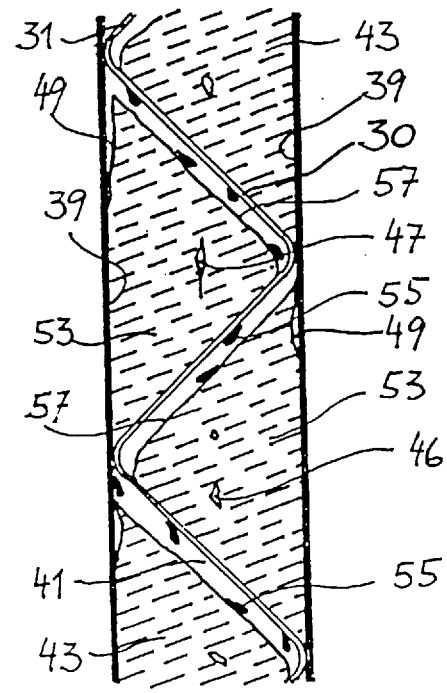
FIG. 9 shows the crystal layer of FIG. 8 during sweating.

If, for example, oil is removed from paraffin in the said crystallizer, a layer of crystals 43 forms on the cooled (crystallization surfaces 39 as shown in FIGS. 6, 7 or 8, 9. In some cases, depending on the product, an open space 45 is left between the two crystallization layers 43, through which the remaining mother liquor, which has a high oil content, can be discharged, or the two layers 43 grow together to form a single layer 44, in which case inclusions 46 can form between the layers (FIGS. 8 and 9). During the sweating phase the oily fraction is first sweated out through the central surfaces 47 of the crystal layers 43. As soon as the crystal layer 43 has been softened by heating, its adhesion to the crystallization surface 39 is reduced. Parts 53 of the crystal layer 43 become detached from the crystallization surface 39 when or before the adhesive surface 49 of the crystal layer 43 has been melted by heating. The parts 53 remain suspended on the perforated sheet 31, which abuts the crystallization surface 39 at an acute angle. By being detached from the crystallization surface 39, the sweatable surface of the crystal layer 43 is enlarged. The liquid phase 55 can flow out at the central surfaces 47 and at the surface 49 on the crystallization surface side. Expulsion of the liquid phase is facilitated by the pressure of the weight of crystals 53. The liquid phase 55 drips between the crystal parts 53. Part of the liquid phase 55 flows away on the crystallization surfaces 39. The surface 49 of the crystal parts 53 on the crystallization surface side is melted by the heat supply, so that the liquid phase 55 finds channels or melts freely between the crystallization surface 39 and the crystal parts 53 and flows away through the openings 35 at the edges 37 of the perforated sheets 31 in contact with the crystallization surfaces 39. Mother liquor 55 falling on to crystal parts 53 runs over the sloping surface 57 of the part 53 and drips through holes 33, 35 in the perforated sheet 31 into the next-lowest triangular zone 41.

The screen-like supporting structures 29, for example perforated metal sheets 31, can be zig-zag prefabricated or preassembled installation units, located between pairs of crystallization wall surfaces 29. Since the sheet-metal structures are in thermal contact with the surfaces 39, their solid portions will function as crystallization surfaces, positioned at an inclination with respect to the surfaces 39. The surfaces 39 need not be vertical.

Various changes and modifications may be made, and any features described herein may be used with any of the others within the scope of the inventive concept.

What is claimed is:

1. A process for a fractional crystallization of substances comprising filling a mixture of substances into a crystallizer, the crystallizer having vertical or inclined crystallization surfaces, said mixture containing (i) a substance which, when crystallized, does not adhere sufficiently to the vertical or inclined crystallization surfaces of the crystallizer, and (ii) fractions having a lower melting point than said substance, cooling said crystallization surfaces and thus, cooling the mixture and crystallizing said substance in layers on said crystallization surfaces, discharging remaining liquid from the crystallizer, heating said crystallization surfaces and thus sweating said crystallized substance, and during said sweating, retaining crystals on a screen-like supporting structure disposed between the crystallization surfaces, said crystals due to their weight and their insufficient adhesion to the crystallization surfaces become detached from the crystallization surfaces, while permitting liquid fractions to flow through the screen-like supporting structure.

2. The process according to claim 1, wherein the screen-like supporting structure is at an angle so as to be inclined to the crystallization surfaces; and further comprising holding crystals becoming detached on said screen-like supporting structure.

3. The process according to claim 1, further comprising dividing the layers approximately horizontally into strips.

4. The process according to claim 1, wherein during said heating and sweating the crystals detached from the crystallization surfaces so that the crystals slide down the crystallization surfaces and then rest on the screen-like supporting structure.

5. The process according to claim 1, further comprising purifying the resultant mother liquor thus obtained at least once more by fractional crystallization, by repeating the steps of claim 1.

6. The process according to claim 1, further comprising repeating the steps of claim 1; and then fractionating the resulting purified fractions by a fractional crystallization without a screen-like supporting structure, or by a fractionalization.

7. The process according to claim 1, wherein said substances comprise paraffins, and at least one substance selected from the group consisting of oils, fats, waxes and other organic products having similar physical properties.

8. A crystallizer for the fractionating crystallization of substances, including substances which, when heated, have poor adhesion to crystallization surfaces of the crystallizer, the crystallizer comprising a plurality of vertical or inclined crystallization surfaces which are coolable or heatable by a heat transfer medium, a screen-like supporting structure disposed between the crystallization surfaces, the screen-like supporting structure being impermeable to a solid phase, but permeable to a liquid phase, for trapping and suspending crystals between the crystallization surfaces when the crystals become detached from the crystallization surfaces, the screen-like supporting structure permitting a liquid fraction to flow therethrough.

9. The crystallizer according to claim 8, wherein the screen-like supporting structure is positioned at an angle to be inclined to the crystallization surfaces.

10. The crystallizer according to claim 8, wherein the crystallizer comprises at least two spaced apart crystallization surfaces; and the screen-like supporting structure has surfaces which divide the space between the crystallization surfaces approximately horizontally.

11. The crystallizer according to claim 9, wherein the surfaces of the screen-like supporting structure comprise superposed inclined surfaces which slope in opposite directions.

12. The crystallizer according to claim 8, wherein the screen-like supporting structure is in thermal contact with the crystallization surfaces.

13. The crystallizer according to claim 10, wherein the screen-like supporting structure is assembled in installation units which are disposed between pairs of crystallization surfaces.

14. The crystallizer according to claim 13, wherein the installation unit is an element having a repeated zig-zag shape.

15. The crystallizer according to claim 8,
wherein solid parts of the screen-like supporting structure form the crystallization surfaces.

16. The crystallizer according to claim 8, wherein the crystallization surfaces are inclined.

17. The crystallizer according to claim 8, wherein said screen-like supporting structure comprises a metal, and is in thermal heat transfer contact with said heat transfer medium.

18. The crystallizer according to claim 8, which is a static crystallizer.

19. The crystallizer according to claim 8, which is a falling-film crystallizer.

20. An arrangement of a plurality of crystallizers for multi-stage fractionation of substances which, when crystallized easily become detached from vertical or inclined crystallization surfaces of a crystallizer, wherein at least one crystallizer is a crystallizer according to claim 8.

* * * * *